United States Patent
Cardno

(10) Patent No.: US 9,798,707 B2
(45) Date of Patent: Oct. 24, 2017

(54) METHODS, APPARATUS AND SYSTEMS FOR DATA SORTING, VISUALISATION AND RELATED APPLICATIONS

(71) Applicant: New BIS Safe Luxco S.à r.l, Luxembourg (LU)

(72) Inventor: Andrew John Cardno, San Diego, CA (US)

(73) Assignee: New BIS Safe Luxco S.à r.l., Luxembourg (LU)

(*) Notice: Subject to any disclaimer, the term of this patent is extended or adjusted under 35 U.S.C. 154(b) by 386 days.

(21) Appl. No.: 14/453,226

(22) Filed: Aug. 6, 2014

(65) Prior Publication Data

US 2015/0046794 A1    Feb. 12, 2015

Related U.S. Application Data

(60) Provisional application No. 61/862,702, filed on Aug. 6, 2013.

(51) Int. Cl.
| | |
|---|---|
| G06F 17/00 | (2006.01) |
| G06F 17/22 | (2006.01) |
| G06F 17/30 | (2006.01) |
| G06F 17/21 | (2006.01) |

(52) U.S. Cl.
CPC ........ *G06F 17/2247* (2013.01); *G06F 17/218* (2013.01); *G06F 17/30595* (2013.01)

(58) Field of Classification Search
None
See application file for complete search history.

(56) References Cited

U.S. PATENT DOCUMENTS

| | | | | |
|---|---|---|---|---|
| 2003/0167278 A1* | 9/2003 | Baudel | ............. | G06F 17/30716 |
| 2004/0168115 A1* | 8/2004 | Bauernschmidt | ... | G06F 17/2241 |
| | | | | 715/238 |
| 2004/0174397 A1* | 9/2004 | Cereghini | .............. | G06Q 30/02 |
| | | | | 715/855 |
| 2004/0205551 A1* | 10/2004 | Santos | .................. | H04L 69/329 |
| | | | | 715/234 |
| 2005/0057566 A1* | 3/2005 | Githens | ................. | G06F 19/321 |
| | | | | 345/440 |
| 2005/0119990 A1* | 6/2005 | Lee | .................... | G06F 17/30905 |
| 2006/0101134 A1* | 5/2006 | Nocera | ............... | H04L 41/0893 |
| | | | | 709/223 |
| 2007/0022000 A1* | 1/2007 | Bodart | .................... | G06Q 10/10 |
| | | | | 705/7.38 |
| 2009/0063403 A1* | 3/2009 | Malloy | ............. | G06F 17/30333 |
| 2011/0138357 A1* | 6/2011 | Mishra | ................ | G06F 11/3696 |
| | | | | 717/124 |
| 2011/0179370 A1* | 7/2011 | Cardno | ................. | G06T 11/206 |
| | | | | 715/771 |
| 2011/0261049 A1* | 10/2011 | Cardno | .................. | G06Q 10/10 |
| | | | | 345/419 |

* cited by examiner

Primary Examiner — Howard Cortes
(74) Attorney, Agent, or Firm — Merchant & Gould P.C.

(57) ABSTRACT

A method of creating a style sheet for the generation of a graphical representation of a data set made up of a plurality of data elements or values used in a data visualization computing system is described. The method having the steps of retrieving the data values of the data elements in the data set; determining the types of data elements in the set; obtaining the style attributes associated with each type of data element; developing a hierarchy of style attributes; and creating a style sheet to apply to the data set.

21 Claims, 3 Drawing Sheets

METHODS, APPARATUS AND SYSTEMS FOR DATA SORTING, VISUALISATION AND RELATED APPLICATIONS

This application claims benefit of U.S. Provisional Ser. No. 61/862,702, filed 6 Aug. 2014 and which application is incorporated herein by reference. To the extent appropriate, a claim of priority is made to the above disclosed application.

FIELD OF THE INVENTION

The present invention relates to methods, apparatus and systems for data sorting, visualisation and related applications.

BACKGROUND

The use of style sheets for coding is a way that presentation structure can be separated from the detail of the content. For example, in web design, the markup language (i.e. HTML or XHTML) of a webpage contains the semantic content and structure for the page, but does not define its visual layout or style. The style is defined in an external file—the style sheet file—using a style sheet language such as CSS or XSLT. Previous to this design approach, the methodology was to have both style and structure defined by the markup language of a page. In short, a style sheet is a file that contains a set of rules which are used to impose formatting information on a data set or sets which are held as a separate file or files.

For example, in word processing and desktop publishing, a style sheet is a file or form that defines the layout of a document. The style sheet specifies parameters such as the page size, margins, and fonts. These parameters can then be carried over to a number of files or documents to give a uniform appearance for documents that contain different detailed content. Different style sheets can also be defined, for example, one for official reports, one for letters, one for team meeting memos or minutes, one for action plans, etc.

Prior to the advent and use of style sheet languages such as CSS, the commonest way to format a file was to include or contain the presentational attributes within the HTML markup; all font colours, background styles, element alignments, borders and sizes were coded within the HTML and as a consequence it was often required to repeat the information within the HTML. The advent of CSS allowed much of this formatting information to be moved to the style sheet file. This allowed the HTML language to be considerably simplified. Also, holding all the presentation styles in one file helped to significantly reduce maintenance time, and helps to reduce human error. For example, the font colour associated with a type of text element may be specified—and therefore easily modified—throughout an entire website simply by changing the line or lines of code in the style sheet file. The previous or alternate approach, using styles embedded in each individual page, required the same edit to be carried out for every page. As this was a cumbersome and time consuming process, errors tended to creep in due to human error.

An "external" style sheet file can be associated with an HTML document or documents to format the presentation of the document(s). Multiple style sheets can also be 'called' or imported. If multiple style sheets are used, these can be prioritised, with the style sheet with the highest priority controlling the content display. Declarations not set in the highest priority source are passed on to a source of lower priority, such as the user agent style. This process is called cascading.

A cascading style sheet is a style sheet that anticipates that other style sheets will either fill in or override the overall style sheet. This provides the designer the advantage of being able to rely on the basic style sheet when desired and overriding it when desired. The filling in or overriding can occur on a succession of "cascading" levels of style sheets. For example, one style sheet could be created and linked to from every separate page of a website as the overall style sheet (e.g. to set font type, font size, text colour, background, etc). For any portion of a page that includes a certain kind of content—for example, a catalogue of products—another style sheet can be used, this secondary style sheet amending the basic style sheet for that particular content. Another style sheet could be specified as applying to a particular type of product display.

As well as style sheets which control visual or display elements such as text size and colour, the style sheets may also include functional aspects. For example, the style sheet can include a function to sort data included in a file, as specified by the style sheet. It is also known to combine data tables with table specific style sheets which perform functions such as sorting, to create a table or similar which has an overall layout and look dictated by a style sheet, and where the data is sorted as dictated by a style sheet.

Although a separate style sheet or sheets can be created and applied to a page or data set as required to format the presentation or order of a document or documents, one issue with the use of style sheets is that for each particular required situation, an individual style sheet is still necessary. For multiple separate sets of data, it is still necessary to apply and maintain separate style sheets. If a number of different formats are potentially required, these will need to be thought out beforehand, and a number of style sheets will have to be created and prioritised/cascaded as required for each different format. This potentially requires the allocation of increased memory, and increased processing power to achieve the end result.

It is an object of the present invention to provide a method of sorting and visualising data which goes some way to overcoming the above-mentioned disadvantages or which at least provides the public or industry with a useful choice.

It is a further object of the present invention to provide an apparatus for sorting and visualising data which goes some way to overcoming the above-mentioned disadvantages or which at least provides the public or industry with a useful choice.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge.

SUMMARY OF THE INVENTION

The term "comprising" as used in this specification and indicative independent claims means "consisting at least in part of". When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

In a first aspect, the present invention provides a data visualisation computing system, a computer implemented method of creating a style sheet for the generation of a graphical representation of a data set made up of a plurality of data elements or values, the method having the steps of:
retrieving the data values of the data elements in the data set;
determining the types of data elements in the set;
obtaining the style attributes associated with each type of data element;
developing a hierarchy of style attributes; and
creating a style sheet to apply to the data set.

BRIEF DESCRIPTION OF THE DRAWINGS

Further aspects of the invention will become apparent from the following description which is given by way of example only and with reference to the accompanying drawings which show embodiments of the device by way of example, and in which.

DETAILED DESCRIPTION OF THE INVENTION

Figure 1:
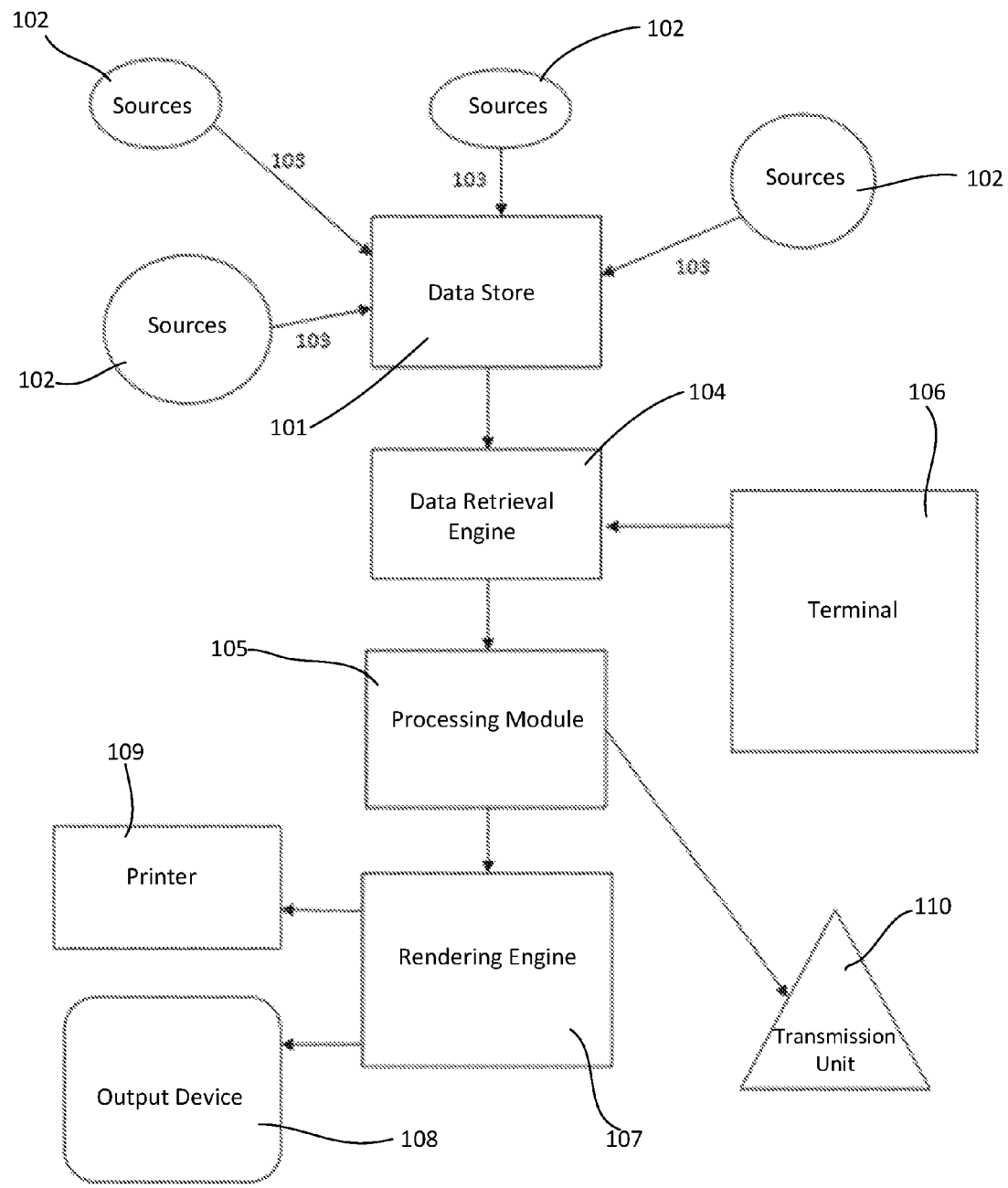
FIG. 1 shows a schematic overview of the architecture of a system suitable for the preferred embodiments, with the main building blocks or system elements and the main connections between these elements shown.

According to various embodiments of the present invention, systems and methods are herein described in which the types of data elements in a dataset or datasets are first assessed or determined, and a set of style attributes or rules is then associated with each type of element. A hierarchy of style attributes is then developed for the data elements, the hierarchy used to create a style sheet which is then applied to the data set.

Although the various specific embodiments described below are in relation to the representation of data in table form, it will be understood that the methods and systems described may also be applied to other suited graphical representation methods, such as data plots and graphs for example.

System Hardware and Architecture

The methods and systems described may be utilised on any suitable data visualisation system where data values are represented in table cells, or as data points which are displayed using various different formats based on the data value itself or a range of values in which the data value lies (e.g. bar chart, pie chart, scatter plot, line chart, heat map, box spiral, etc).

According to the embodiments described below, a data sorting and visualisation computing system utilises the methodology of the invention using various modules and engines.

The data sorting and visualisation system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the data sorting and visualisation system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions, may be developed or implemented using any suitable software programming language and toolkit, such as, for example, a C-based language and compiler. Further, the program instructions may be stored in any suitable manner such that they can be transferred to the memory device or read by the processor, such as, for example, being stored on a computer readable medium. The computer readable medium may be any suitable medium for tangibly storing the program instructions, such as, for example, solid state memory, magnetic tape, a compact disc (CD-ROM or CD-R/W), memory card, flash memory, optical disc, magnetic disc or any other suitable computer readable medium.

The data sorting and visualisation system is arranged to be in communication with data storage systems or devices (for example, external data storage systems or devices) in order to retrieve the relevant data.

It will be understood that the system herein described includes one or more elements that are arranged to perform the various functions and methods as described herein. The embodiments herein described are aimed at providing the reader with examples of how various modules and/or engines that make up the elements of the system may be interconnected to enable the functions to be implemented. Further, the embodiments of the description explain, in system related detail, how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using, any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data sorting and visualisation computer, a database query computer, a graphical analysis computer, a gaming data analysis computer, a manufacturing data analysis computer, a business intelligence computer etc., where the computer has been specifically adapted to perform the described steps on specific data captured from an environment associated with a particular field.

Overview

FIG. 1 is a schematic diagram showing the architecture of the system of the preferred embodiment, with the main building blocks or system elements and the main connections between these elements shown. A data store 101 is shown. The data store 101 can be an enterprise data warehouse, an operational data store, a data mart, a storage array, or similar, and can be of the type which receives and stores data from multiple sources 102, which may be widely geographically separated. Further, the data store may be a cache memory used to temporarily store incoming data captured in real time—for example streaming data. The data store may also be a central location, or a distributed network. As examples (but not limited to these), the data could relate to the use of ATMs, use of vending machines, cell phone use, gaming machine use, product sales, take-up of a particular service, stock or commodity prices, currency exchange rates, etc. Some or all of the data from these point-of-service machines could be uploaded automatically to the data store 101 via a network. There may be several different types of particular data associated with each individual entry. For example, for ATM use each individual withdrawal might make up a data element, and the machine location, the time of use and the amount withdrawn could be associated with each individual use or data element. For cell phone use, each individual call might make up an individual data element, with location, time and call duration associated with the individual data element. Similarly, game machine use could record an individual transaction, such as an individual 'buy-in' or use, with the monetary amount, the time of use, and the machine location all associated with this individual data element. It can be seen that other data elements can be iterated from these: frequency of use (e.g. for ATMs or gaming machines), locational density (e.g. number of cell phone calls made from or to a particular cell), user usage frequency (every time an individual user uses a service), etc. The data can be sent to the data store 101 from the sources 102 by way of any suitable communication system 103—for example, wireless transmission, transmission via an established telephone network (mobile or landline), via a built-in hardwired grid, etc. A data retrieval engine 104 is in communication with the data store 101 to enable the stored data to be retrieved and transferred to other elements of the system. A processing module 105 is in communication with the data retrieval engine to receive the data and process this as outlined below. The data retrieval engine 104 and processing module 105 are in communication with external inputs from a terminal or interface 106 which can be, for example, a user interface for inputting commands or inserting programs or code. A rendering engine 107 is in communication with the processing module 105. The rendering engine 107 is arranged to render the data elements to create a display on an image space on an output device 108 as instructed by the processing module 105. For example, the rendering engine 107 would receive instructions to create a table, and in accordance with the received instructions, would create the table on the output device 108 and populate the cells of the table with data elements in the locations specified by the processing module 105. A printer element 109 is also shown in parallel with the rendering engine 107 and the output device 108. The printer device 109 can be used to produce hardcopy of the result of the application of the style sheet to the retrieved data elements by the processing module 105. The rendering engine can be adapted to produce outputs suitable for both on-screen/on-line, and hardcopy or print output. Also shown is a transmission unit 110. The transmission unit 110 can take the output of the processing module and transmit this in a suitable format—e.g. as an e-mail to a smartphone, suitably formatted for reading via e-mail.

Figure 2:
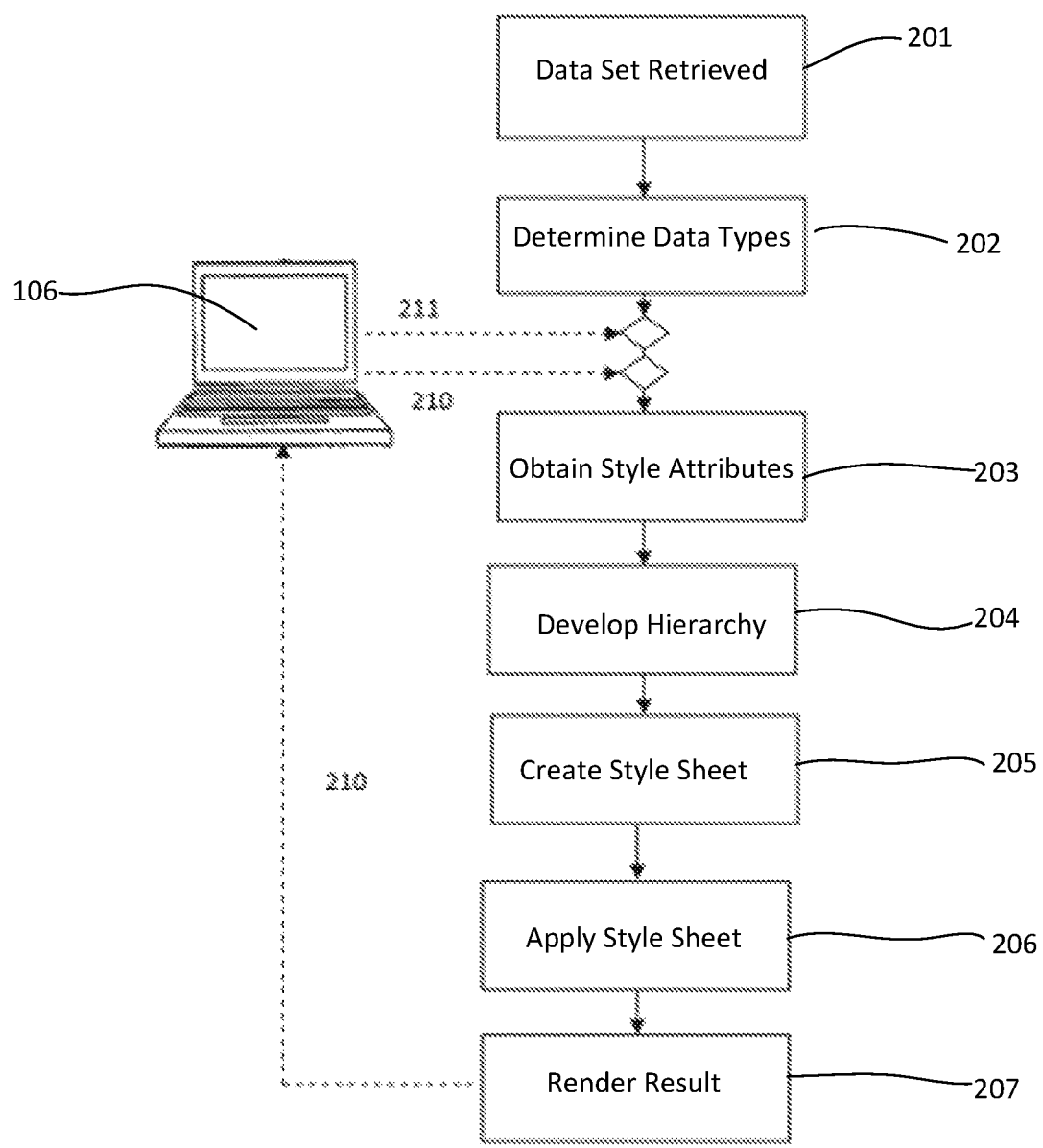
FIG. 2 shows a schematic overview flow diagram of the method as used for the preferred embodiments.

FIG. 2 shows a flow diagram of the steps of the general method of the present invention. The herein described system utilises the computer implemented method to retrieve or obtain data values, develops a hierarchy of style attributes to apply to the data values, sorts and determines the types of data elements in the set; and applies the style attributes to the data elements to create a style sheet to apply to the data set.

In step 201, a data set made up of a plurality of data values is retrieved from the data store 101. This can be in response to a user input command where a user requests certain data, which can be bounded as required (e.g. a date range, sales within certain upper and lower limits, etc). In step 202, the types of data elements in the retrieved set are determined or assessed. Particular examples of the types of data elements which could be retrieved and assessed are outlined below in the preferred embodiments. Next, in step 203, the style attributes associated with each type of data element are obtained. Examples of possible style attributes are given below for the preferred embodiments. In step 204, a hierarchy of style attributes is developed. The hierarchy dictates how the elements are ordered and formatted, and so in step 205, a style sheet is created which is applied to the retrieved data elements in step 206. In the final step 207, after the style sheet has been applied to the data elements, the result is rendered and displayed on an output device as outlined above. The line 210 shows how a user can review the results from the final step, and can change the weighting of the style attributes so that the hierarchy of style attributes changes, changing the style sheet which is created in step 205. The line 211 shows a user input at the beginning of the process, so that rather than accept the automatic weightings which may be applied to the style attributes of the data elements (a conditional priority approach, described in greater detail below), the user enters these manually before the subsequent steps are carried out (a user-set or user-dictated priority approach, which is described in more detail below).

In the process outlined above, the data set is retrieved from the data store 101. A user enters the required fields via the terminal or interface 106, so that the data retrieval engine 104 can retrieve the data elements from the data store 101. These fields could be, for example: a date range or ranges, number or units of sales, incidents of use over a time period, locations, etc. There can also be sub-fields associated with the main fields—for example, the date range could return data relating to sales over the range of a year or years, with further sub-detail of sales per month, week or day within that particular range. Incidents of use could be numbered per week, with further sub-detail showing incidents of use per day (every 24 hours), and sub-sub-detail of the timing of incidents of use within that period. This level of detail can be useful for pattern analysis. For example, when analysing usage, weekday usage may be heavier or lighter than weekend use, and this can be useful for planning maintenance or developing sales strategies.

There are two main ways in which the hierarchy of style attributes can be developed once the data elements are retrieved: firstly, a conditional priority approach, and secondly, a user-set or user-dictated priority approach.

For a conditional priority approach, the particular combination of fields chosen by a user dictates the hierarchy with no further input required. As an example, a user may firstly choose a date range spaced over a number of years, plus sales figures. The processing module 105 receives the data and processes this to create the style sheet. As the date range is over a number of years, this is given the highest priority. The sales data is given a lower priority than the date range. Depending on the data chosen, the processing module 105 may apply default settings to certain elements. For example, if a number of years are chosen, the default for the style sheet may be to show a 'year' view only, or the default may be to show both years and months as a sub-range within those years. However, knowing the relative default priority of the two main elements (time range, and sales), the style sheet which is developed will place 'time' horizontally, in either the column cells of a table, or along the x-axis of a graph, and sales data vertically, in the row cells of a table, or along a y-axis. The type and range of data can also dictate presentation output—for example, if the number of years chosen is between a certain minimum and maximum number, and only the total sales figures are retrieved, then the presentation style may default to a histogram, bar chart or similar. If the range chosen is outside this range, then the display may revert to another style—for example if a single year is chosen, the display may revert to showing sales by individual month on a bar chart, so that 12 bars are shown rather than a single bar.

If a third parameter such as location is also chosen, this is given the lowest priority, and the style sheet created will default to showing this data within the bounds of the output dictated by the two elements (time and sales) with higher priority. An example of this is described for the first embodiment below.

For a user-set or user-dictated priority approach, the user firstly chooses the data elements which they require, and then manually assigns or forces a priority onto each of these, to create the desired hierarchy. The user can either accept the default output display options, or manually choose an output style. Once a first display iteration is completed, the user can accept this as the end result if it is to their satisfaction, or they can refine the output, by changing the output style (e.g. from a bar chart to a line graph or similar), or by changing the priority to change the rankings of the hierarchy.

First Embodiment—Sales Data

As described above, FIG. 1 shows the main architectural elements of the system. Raw data values are stored in the data store 101. In the first embodiment, these are data values relating to product sales. As outlined for the examples given above, there are several different characteristics that can be associated with each individual data element. A particular example is given below. However, there are many different types of characteristics which could also be associated and the example should not be taken as limiting. In this particular example, the associated characteristics which are weighted are as follows: price/size of sale, time of sale, location of sale. This data is received and stored centrally in the data store 101. A user inputs a request via the terminal or interface 106. The parameters of the request can be varied to structure the request to request data within certain boundaries or limits. In this particular example sales within a certain overall time period are chosen, over the course of a five-year period. Certain specified locations such as branches within a specified geographical location such as a city or state are also requested.

The data retrieval module 104 extracts the requested data from the data store 101 and passes this to the processing module 105. The processing module 105 processes each data element and applies a set of rules. These can generally be broken down into two subsets: a first subset of rules for presentation (colour, text etc.) as in a standard style sheet, and a second subset of rules for functional elements (e.g. sorting). The processing module 105 assigns a weighting to the characteristics of the data. These weightings can be varied depending on the instructions contained within the processing module 105, and can be user-assigned (a user-set or user-dictated priority approach) or assigned automatically (a conditional priority approach) and a typical example is given below. However, this should not be taken as limiting the instructions or weighting to these particular parameters. For the purposes of the example, the weightings are manually assigned by a user (a user-set or user-dictated priority approach), and a weighting is given on a scale of 1-10. These are relative values, not absolute, so the number itself is only important in relation to how it positions the attribute in relation to other chosen attributes.

In this example, the second rules subset consists of two subroutines: firstly sorting by function, and secondly applying a priority to each function or characteristic. For each of the three characteristics of the data elements given above (dollar value of total sales, time of sale, location of sale) a sort function is applied—e.g. sales can be sorted from largest dollar value to smallest. There are multiple ways to sort the 'time of sale', for example by both 'month' and 'year', or by 'sales quarter' and 'year'. Location of sale can also be sorted in multiple ways, for example by both state and city. Next, a priority is applied to each function or characteristic. In this example, 'time of sale' is weighted heavily as the user wishes this to dominate, but the user also wishes to sort the data by both 'sales quarter' and 'month', with year dominant over 'sales quarter'. Therefore, time of sale—year is weighted as '10', and 'time of sale—quarter' is rated at '8'. The user also wishes to sort the sales by location, but considers this to be secondary to time, and considers individual city locations to be secondary to state locations. 'Location—state' is given a weighting of '7', and 'location—city' is given a weighting of '6'. 'Dollar value of total sales' is given the lowest weighting of '3'. Chronology and location can also be varied, but in this example the time elements are sorted in a linear chronological manner (date ascending: 2008, 2009, 2010, etc. Q1: January, February, March, Q2: April, May June, etc), and state and city are sorted alphabetically. 'Dollar value of total sales' is sorted from highest to lowest, descending.

As 'time of sale—year' has been weighted the heaviest, this will dominate, so the data will be sorted by year, and then by quarter, as this is the second most heavily weighted. The data will then be sorted by state, and then by city. Finally, the data will be sorted by price/size of sale.

In this embodiment, the data is output as a table. The processing module 105 creates a table of suitable size by calculating the maximum numbers of rows and columns required. The processing module then populates the cells. In this example, columns for the years are created first, then sub-columns showing the quarter. Rows are created to show location by state, with sub-rows within these rows to show individual cities. The sales are then sorted within the sub-columns and sub-rows from highest to lowest.

The first subset of rules for presentation (colour, text etc.) is also applied, generating the required font, font size, colour elements for background, text, table etc. Shading can also be applied across cells or groups of cells—for example blue shading through to red descending downwards (most to fewest) for city sales within a state. These fields can also be tied to the hierarchy or have their own hierarchy (default or otherwise). For example, certain fields can have a higher weighting for background colour. If this field is at the top of the hierarchy, then this field will set the background colour.

This creates a grid of sales data where a user can easily find the cell sub-set which contains the sales data for a particular quarter within a year for a particular city, and easily compare this to cell sub-sets. For example, the data for a particular state or city in a certain quarter or year can be compared to other quarters or years for the same location. Alternatively, the data for a particular state or city in a certain quarter or year can be compared to other locations for the same time period.

Thus, it can be seen that for any particular combination of data elements, a hierarchy or priority can be applied to the data elements and characteristics thereof, that results in a style sheet being generated 'on the fly' for given data elements. The output created by the style sheet can be changed easily by changing the priority of elements, which changes the order of the elements in the hierarchy. For example, a user could change the weighting of the data elements to change the resulting table. If a user wishes to place greater emphasis on location, the weightings for the geographical locations are changed so that they are highest in the hierarchy. 'Location—state' is given a weighting of '10', and 'location—city' is given a weighting of '9'. 'Time of sale—year' is weighted as '8', and 'time of sale—month' is rated at '7'. As before, 'dollar value of total sales' is given the lowest weighting, of '6' or less. As before, the processing module 105 creates a table of suitable size by calculating the maximum numbers of rows and columns required. The processing module then populates the cells. In this example, columns for the states are created first, then sub-columns showing individual cities. Rows are created to show years, with sub-rows within these rows to show months. The sales are then sorted within the sub-columns and sub-rows from highest to lowest.

This change has been easily achieved by a user inputting a change in the weighting given to elements, to change their position in the hierarchy. The style sheet is generated 'on the fly' to create the required output. This results in less work being required than would otherwise be the case to individually change or manually manage the functions. To achieve the same result using a normal style sheet, the style sheet would need to be manually formatted so that the output result is that which is specifically required for a particular circumstance. For the example above, the style sheet must be formatted to first sort by year, then by month, then by location, etc. The style sheet would then have to be reformatted to first sort by location (state then city), then by year, then by month, then by sales. That is, if a change is required, the entire style sheet is required to be re-ordered/re-formatted to output the changed, specific instructions.

It can be seen that less memory is required as the style sheet is created 'on the fly' as opposed to having a number of pre-formatted style sheets which can be applied as required to achieve the same result. The need for multiple or cascaded style sheets has been removed. Less processing power is required to create a hierarchy and then a style sheet from the hierarchy than to create an end result from multiple style sheets. The memory required for multiple style sheets and for cascading has been eliminated. Workload is reduced (both coding and processing work) as an individual style sheet is not required for each specific situation. Also, less processing power is required as there is less to process, and the desired output is either achieved quicker, or with less processing power, or both.

Second Embodiment—Gaming

Figure 3:
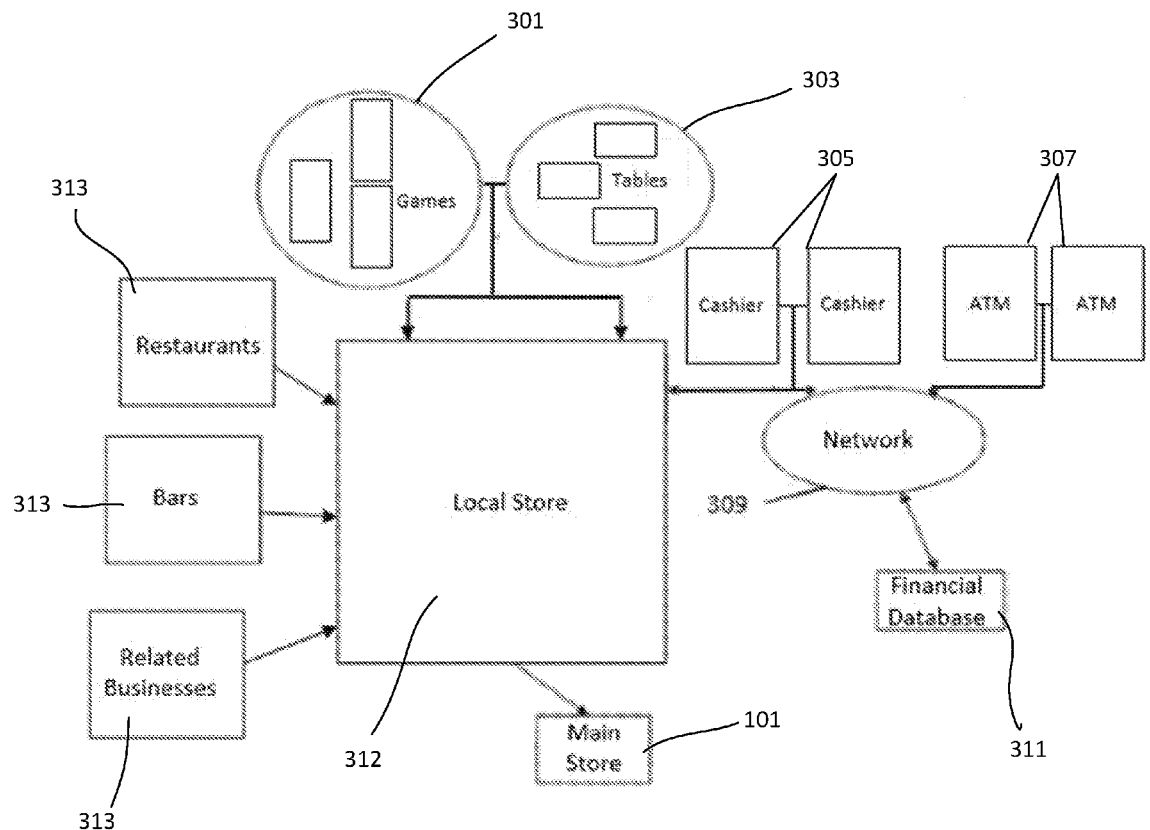
FIG. 3 shows a schematic view of elements within a gaming environment, such as game machines and gaming tables, and associated elements such as ATMs, with communication connections between these and a local data store and a main offsite data store also shown.

In this embodiment, data is gathered from a gaming environment such as that shown diagrammatically in FIG. 3. In the example shown, the gaming environment consists of a number of gaming machines 301, and electronic tables 303. Other types of gaming terminal could also be present. However, for the purposes of simplicity, this example is limited to two different types of terminal: the gaming machines 301 and the electronic tables 303. Each of the gaming machines 301 could be, for example, a slot machine which a single user plays at one time. Each of the electronic tables 301 could be a multiple-user table. For example a roulette table, a blackjack table, or similar. The gaming machines and the tables are adapted to communicate electronically with other systems using any suitable protocols, such as data packet protocols.

The gaming environment further includes a number of electronic cashier devices 305 and ATMs 307 which are in communication via a Wide Area Network 309 with one or more financial databases 311.

Data from all of these devices is transferred to a data store such as data store 101. This can occur via transfer first to a localised data store such as local store 312, with a regular data dump to the main store 101. Local store 312 can also compile and store related but not directly relevant data such as data relating to the other transactions of customers—at restaurants, souvenir shops, bars and other related businesses 313. The location of each of the machines, tables, ATMs etc is static. The type of data measured by each of these could be both time- and amount-specific, and could relate to both buy-ins and pay-outs. The type of data measured by the gaming table could also relate to numbers of individual users using the gaming table for a particular time period, and also to their particular location relative to the table. For example, the stools around a blackjack table could be weight-sensitive and record when a user is occupying the location.

As for the first example, a chart could be created which shows income revenue against time in a table form. This would be useful for analysing busy times—on an individual daily basis, or on a weekly, monthly or yearly basis. Peaks (such as New Year's Eve or similar) can easily be identified. Once these peaks are identified, extra staff can be rostered on, additional electronic cashier devices and ATMs can be activated or these can be refilled more frequently, etc. The relative sizes of these peaks can also be analysed, for example by having an output in the form of a rendered heatmap or similar. This can be useful when decisions are being made as to numbers of extra staff or similar.

However, a user may also require an analysis of revenue against location, for example for the purposes of reconfigurations to the gaming environment.

In this embodiment, the data store holds a 'map' of key features of the gaming environment. The location of the gaming machines, the table and the ATMs are included on the map. Other key features are also included—for example, the locations of entrances and exits to the gaming environment, the layout of the room so that thoroughfares or similar are mapped (gaming machines tend to be aligned in facing rows to create corridors), and the location of other key features such as bars. All of the raw data relating to time, frequency, amount and location is transmitted to the data store 101. As for the first example, the data retrieval module 104 extracts the requested data from the data store 101 and passes this to the processing module 105. In this embodiment, the user forces their constraints on the inputted data elements, choosing to weight 'location' so that this element is at the top of the hierarchy. Revenue is ranked below location. As for the first element, the processing module 105 processes each element and applies the rules to create a style sheet which dictates the output.

The output could be, for example, a table. The location data could form the columns of the table. This could be arranged by type of machine (e.g. all the slot machines in one column subset, followed by the gaming tables), and distance from a feature (e.g. distance from the main entrance/exit). Revenue could be entered in sheet rows. In this manner, it can be easily seen if there is a correlation between distance from a feature and revenue, or location in relation to a feature and revenue. For example, those slot machines furthest from the entrance or exit may have significantly different revenues from those which are closest. The minimum buy-in or payout can be adjusted accordingly. Positions on a multi-player gaming table can be plotted against revenue. Those at the ends, or where the stools face in a certain direction may be found to have significant differences from others (facing away from the doors or bar may distract players less). The alignment and location of the table can be adjusted accordingly.

By changing locational parameters, it can be seen that it is easy to review key data relating to revenue, and thus to make decisions about locational reconfiguration.

Multiple locational parameters with different weightings can also be added to an analysis. For example the distance from the entrance/exit could be given the highest weighting, with distance to the bar ranked below this (or vice-versa), and revenue ranked under these. The result could be displayed as a table, a heat map or any suitable output display, making it easy to analyse the results and note any that are of interest in terms of configuration.

A fourth (or more) element can also be added, such as time, for example. By weighting location and time above revenue in the hierarchy, hotspots for play can easily be identified. Gaming machines may have more users at certain times of day, and certain machines in certain locations may be used more frequently, by a greater number of individual users, than others. Analysis of location against times of the year could also be easily carried out. Holiday evenings can be extremely busy. Location could be weighted to be highest in the hierarchy, with time ranked below this, and revenue below both. This would allow a user to easily identify if certain games were more popular than others at certain times of the year. For example, slot machines may be more popular than gaming tables on New Years Eve (December 31st), and game tables may be more popular than slot machines around other holiday periods such as Chinese New Year.

If there is a way to identify individuals within the gaming environment, this can be added as a data factor. Use of items such as cash machines can easily be identified, as can any purchases made by credit card. Frequency and amounts of withdrawals/purchase at various locations can be monitored. For a group of users, these transactions can be correlated against time data such as time of day and frequency, and also location. The demographics and habits of those who tend towards higher spending can be identified, and also the factors associated with these habits. Layout and timings can be adjusted accordingly. Associated factors, such as for example the tendency towards a consolatory drink of those who fortune does not favour can also be identified by carrying out a location and spending analysis, and the location of the bar relative to the game machines and tables can be adjusted accordingly.

Previously, in order to carry out these different analyses multiple cascaded style sheets were required. All of the analysis scenarios that a user might wish to run were required to be pre-thought out so that the appropriate style sheets could be coded and then ranked or cascaded as required in order to create an output. This not only required a great deal of pre-planning, and was inherently limiting as only a limited number of set combinations were possible, but large amounts of memory were required to the individual style sheets, and large amounts of processing power were required for running the data through the cascaded style sheets.

The present invention allows an appropriate style sheet to be generated 'on-the-fly'. For any particular combination of data elements, a hierarchy or priority can be applied to the data elements and characteristics thereof, that results in a style sheet being generated 'on the fly' for the given data elements.

The output created by the style sheet can be very easily changed by changing the priority of elements, which changes the order of the elements in the hierarchy. If a user wishes to place greater emphasis on different locations, the weightings for the geographical locations can be easily changed to change the output. A new style sheet is generated 'on the fly' to create the required output. This results in much less work being required than would otherwise be the case to individually change or manually manage the functions. To achieve the same result using a normal style sheet, the style sheet would need to be manually formatted so that the output result is that which is specifically required for a particular circumstance. That is, if a change is required, the entire style sheet is required to be re-ordered/re-formatted to output the changed, specific instructions, or alternatively the cascade order or individual ones of a number of style sheets in a cascade are required to be changed.

It can be seen that less memory is required as the style sheet is created 'on the fly' as opposed to having a number of pre-formatted style sheets which can be applied as required to achieve the same result. The need for multiple or cascaded style sheets is completely removed. The result is that much less memory and much less processing power is required to create a hierarchy and then a style sheet from the hierarchy than to create an end result from multiple style sheets. The memory required for multiple style sheets and for cascading has been eliminated. Workload is reduced (both coding and processing work) as an individual style sheet is not required for each specific situation. Also, less processing power is required as there is less to process, and the desired output is either achieved quicker, or with less processing power, or both.

Example of Fields with Data Weightings and the Resulting Output Table

In the example below, the data elements and their style attributes are those from the first preferred embodiment— sales data. Three attributes of the data elements have been chosen: dollar value of total sales, time of sale, and location of sale. The data elements are sorted by characteristic, and a priority is applied to each attribute. A sort function is applied: sales are sorted from largest dollar value to smallest. 'Time of sale', is sorted by two sub-attributes—year, and sales quarter.

The user wishes 'year' to dominate. Location of sale is sorted by two sub-attributes—both state and city, and the user wishes 'state' to dominate. The user has set 'time' to dominate over 'location', and for both of these to be higher in the hierarchy than 'sales'.

This is achieved by a user manually setting priorities or weighting from 1-10. These are manually applied by the user to each style attribute, as shown in the table below. These are relative values, not absolute, so the number itself is only important in relation to how it positions the attribute in relation to other chosen attributes.

TABLE 1 relative weightings for data attributes

| Data element and attribute/sub-attribute | Weighting |
|---|---|
| 'Time of sale - year' | 10 |
| 'Time of sale - month' | 8 |
| 'Location - state' | 7 |
| 'Location - city' | 6 |
| 'Dollar value of total sales' | 3 |

Certain other style elements are unspecified and in this example revert to a default setting e.g. the time elements are sorted in a linear chronological manner (date ascending: 2008, 2009, 2010, etc. January, February, March, etc). The default sort order for state and city in this example is alphabetically. However, the default could be any suitable data representation e.g. population size. In this example, the user has allowed 'state' to remain (or revert) to the default setting so that 'state' is sorted alphabetically. As 'dollar value of total sales' has been set by a user as a required field, this overrides the default, and once the sales have been sorted by city within the state (as dictated by the user weighting as shown in the table above), the city order is rearranged from highest sales to lowest, descending, as dictated by the final user weighting as shown in the final cell of the table above.

As 'time of sale—year' has been weighted the heaviest, this will dominate, so the data will first be sorted by year, and then by month as this is the second most heavily weighted. The data will then be sorted by state, and then by city. Finally, the data will be sorted by price/size of sale.

The data is output is a table. The processing module 105 creates a table of suitable size by calculating the maximum numbers of rows and columns required. The processing module then populates the cells. In this example, columns for the years are created first, then sub-columns showing individual sales quarters. Rows are created to show location by state, with sub-rows within these rows to show individual cities. The sales are then sorted within the sub-columns and sub-rows from highest to lowest. A table showing example sales data over a three-year period for three states, with three cities in each state, is shown below.

TABLE 2

Example Output Table

| | | | Time | | | | | |
|---|---|---|---|---|---|---|---|---|
| | | | 2010 | | | | 2011 | |
| | | | Q1 | Q2 | Q3 | Q4 | Q1 | Q2 |
| Location | Arizona | Phoenix | 95,021 | 92,004 | 101,002 | 97,201 | 99,294 | 94,234 |
| | | Tucson | 72,724 | 74,093 | 80,924 | 89,992 | 85,632 | 85,643 |
| | | Chandler | 50,295 | 52,887 | 51,456 | 58,002 | 55,493 | 57,943 |
| | California | Los Angeles | 200,453 | 198,346 | 204,578 | 210,743 | 211,512 | 212,345 |
| | | San Francisco | 104,582 | 112,576 | 110,268 | 166,457 | 178,357 | 165,857 |
| | | Hollister | 55,678 | 59,345 | 61,285 | 100,456 | 98,587 | 95,284 |
| | Texas | Dallas | 102,021 | 98,004 | 105,002 | 101,201 | 103,294 | 99,234 |
| | | Houston | 80,724 | 78,093 | 84,924 | 93,992 | 89,632 | 89,643 |
| | | Austin | 54,295 | 56,887 | 55,456 | 62,002 | 59,493 | 61,943 |

| | | | Time | | | | | |
|---|---|---|---|---|---|---|---|---|
| | | | 2011 | | 2012 | | | |
| | | | Q3 | Q4 | Q1 | Q2 | Q3 | Q4 |
| Location | Arizona | Phoenix | 93,465 | 91,684 | 85,021 | 92,004 | 92,002 | 85,021 |
| | | Tucson | 80,222 | 71,368 | 71,754 | 72,193 | 79,924 | 72,756 |
| | | Chandler | 49,678 | 46,987 | 50,295 | 52,287 | 51,226 | 50,495 |
| | California | Los Angeles | 198,758 | 201,567 | 202,000 | 200,784 | 199,367 | 199,387 |
| | | San Francisco | 104,786 | 108,476 | 107,375 | 110,482 | 109,567 | 111,254 |
| | | Hollister | 53,222 | 52,167 | 63,456 | 60,245 | 57,832 | 54,587 |
| | Texas | Dallas | 97,465 | 91,243 | 82,845 | 102,234 | 100,230 | 100,340 |
| | | Houston | 83,222 | 91,368 | 94,032 | 98,340 | 82,954 | 83,456 |
| | | Austin | 53,678 | 56,987 | 59,765 | 52,345 | 53,002 | 61,456 |

In this example, it can be seen that overall, the style sheet presents the data in an easily usable format. However, it can also be seen that there are data points which do not fit the overall pattern generated by the style sheet. In the example, there is data for sales quarters where the sales for a particular city are higher than other cities, and sales quarters where they are lower. The style sheet is arranged so that when this occurs, an assessment is made of the overall order, and the city with the greatest number of higher sales quarters over the chosen date ranges is placed first or highest. See for example Q4 of 2011 and Q1 of 2012. In these two instances, Houston outsells Dallas. However, in the remainder of the sales for the chosen three-year time range, Dallas consistently outsells Houston, so Houston is shown first or above Houston in the rows for sales in Texas. In the output table generated by the style sheet, the data in the four relevant table cells is highlighted in bold. As the description indicates, a subset of rules for presentation (colour, text etc.) is also applied, generating the required font, font size, colour elements for background, text, table etc. As noted, these fields can also be tied to the hierarchy or have their own hierarchy. In this instance, the four fields which are out of place in the pattern are highlighted in bold to draw the attention of a user to the data which is outside or counter to the remainder of the pattern which the data generates.

In this example, the presentation rules have also flagged (by highlighting) another anomaly in the data: in all of the cities chosen, the sales are considerably above the average or mean for Q4 in 2010 and the first two quarters of 2011. The presentation rules subset has flagged these by highlighting the relevant columns. This draws the attention of the user to the relevant data. The higher sales figures in this example are due to a nationwide marketing campaign, which has caused a sales 'bounce'. It can be seen that the campaign has worked for all the cities chosen. If there were data cells which remained un-highlighted in the columns, this would also draw the eye of the user, and allow them to drill down into the data to see if there was a particular reason that a particular area had not 'bounced' with the rest of the nation.

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. In a data visualization computing system, having a display device, a computer implemented method of creating a style sheet for the generation of a graphical representation of a data set made up of a plurality of data elements or values, the method having the steps of:
   a) retrieving the data values of the data elements in the data set;
   b) determining data types of the data elements in the set;
   c) obtaining style attributes associated with each data type of data element, wherein the style attributes determine how the data elements are displayed in the generated graphical representation;
   d) obtaining pre-set or pre-existing weightings for each data element;
   e) developing a hierarchy of style attributes based on the weightings for each data element, wherein the generated graphical representation depends on the hierarchy and the style attributes applied depend on the order of the style attributes in the hierarchy;
   f) creating a style sheet of the style attributes associated with the data type of data element and the hierarchy of style attributes to apply to the data set;
   g) generating a graphical representation of the data set using the style sheet; and
   h) displaying the graphical representation on the display, by:
      i) rendering a rendered output including the graphical representation generated using the style sheet; and
      ii) providing the rendered output to the display device and generating the graphical representation on the display device to allow a user to visualize the data,
   wherein the user can change the weightings for each data element and when the user changes the weightings repeating steps e) to h).

2. The method as claimed in claim 1 wherein in the steps of obtaining the style attributes and developing a hierarchy of style attributes, a user sets relative weightings of each of the data elements.

3. The method as claimed in any claim 1 wherein the steps of obtaining the style attributes and developing a hierarchy of style attributes are divided into the steps of firstly sorting the retrieved data elements by function, and secondly applying a priority or weighting to each function.

4. The method as claimed in claim 3 wherein the hierarchy is developed according to the weightings, the hierarchy forming the framework or basis of the style sheet which is applied to the retrieved data elements to format an output for the data elements.

5. The method as claimed in claim 1 wherein the method also includes the step of applying a set of rules for overall presentational style, to generate the required elements that include but are not limited to font, font size, colour elements for background, text, table size, shading.

6. The method as claimed in claim 5 wherein the elements which relate to overall presentational style are associated with the hierarchy so that the overall appearance of the output depends on the hierarchy.

7. The method as claimed claim 1 wherein in the step of retrieving the data values of the data elements in the data set, a user sets parameters around the data values to be retrieved.

8. The method as claimed in claim 7 wherein the parameters include but are not limited to: a date range, a time range, a location range or location subset, a transaction range or sub set.

9. The method as claimed in claim 7 wherein the user set parameters may be chosen from any combination of, but not limited to, the following elements: a data range, a location range or number of locations, a sales range, a revenue range.

10. The method as claimed in claim 1 wherein the data elements can be any combination of, but not limited to, the following elements: time of sale, location, time of use, size of sale.

11. The method as claimed in claim 1 wherein a user can manually input or rearrange the hierarchy either pre- or post-output.

12. The method as claimed in claim 1 wherein the generated graphical representation of the data is any of, but not limited to, the following formats: table, bar chart, pie chart, scatter plot, line chart, heat map, box spiral.

13. The method as claimed in claim 1 wherein the method includes the step, after the hierarchy of style attributes has been developed, of assessing the overall pattern formed by the hierarchy and the data elements, and developing the overall pattern for the output using those data elements which form the majority, the minority of data elements within the retrieved data which do not naturally comply overridden to fit within the overall pattern.

14. The method of claim 13 wherein the method also includes the step of applying a set of rules for overall presentational style, the minority of data elements which do not naturally fit within the pattern presented in a different manner from the majority data elements.

15. The method as claimed in claim 13 wherein the method also includes the steps of applying a set of rules for overall presentational style, and assessing any results within the overall pattern that lie outside or deviate from the mean or average by an amount, those results presented in a different manner from the majority data elements.

16. The method as claimed in claim 15 wherein the amount is a default amount.

17. The method as claimed in claim 16 wherein the default amount is a percentage.

18. The method as claimed in claim 16 wherein the default amount is a numerical value based on the relevant data elements.

19. The method as claimed in claim 15 wherein the amount is a user-specified amount.

20. The method as claimed in claim 19 wherein the user-specified amount is a percentage.

21. The method as claimed in claim 19 wherein the user-specified amount is a numerical value based on the relevant data elements.

* * * * *